United States Patent Office 3,726,863
Patented Apr. 10, 1973

3,726,863
AMIDES OF 6-ISOCYANATOPENICILLANIC ACID
Milton Wolf, West Chester, James L. Diebold, Broomall, and Scott J. Childress, Philadelphia, Pa., assignors to American Home Products Corporation, New York, N.Y.
No Drawing. Filed June 3, 1971, Ser. No. 149,817
Int. Cl. C07d 99/16
U.S. Cl. 260—239.1          2 Claims

ABSTRACT OF THE DISCLOSURE

Novel amides of 6-isocyanatopenicillanic acid have been prepared which are useful as intermediates in the preparation of antibiotically active penicillins.

---

This invention relates to novel compounds of Formula I

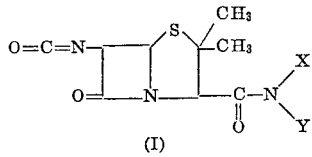

(I)

wherein X and Y when not taken together are selected from the group consisting of cyano,
nitro,
trifluoromethylsulfonyl,
2,4,6-trimethylbenzoyl,
2,3,5,6-tetramethylbenzoyl,
carb(lower)alkoxy,
di(lower)alkylcarbamyl,
(lower)alkylsulfonyl,
di(lower)alkylsulfamyl,
di(lower)alkylamino(lower)alkylsulfonyl,
(lower)alkanoyl,
cyclo(lower)alkanoyl,
naphthylsulfonyl,
pyridylsulfonyl,
furylsulfonyl,

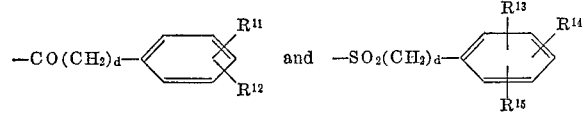

wherein $R^{11}$ and $R^{12}$ are selected from the group consisting of hydrogen, (lower)alkyl, halogen, trifluoromethyl, (lower)alkoxy, phenyl, phenoxy, nitro, (lower)alkylsulfonyl, di(lower)alkylsulfamyl; $R^{13}$, $R^{14}$ and $R^{15}$ are selected from the group consisting of hydrogen, nitro, halogen, trifluoromethyl, (lower)alkyl, (lower)alkoxy, (lower)alkylsulfonyl, (lower)alkylthio, di(lower)alkylsulfamyl, di(lower)alkylcarbamyl, cyano and carb(lower)alkoxy; and the integer $d$ is from 0 to about 6; and X and Y when taken together with the nitrogen atom are selected from the group consisting of

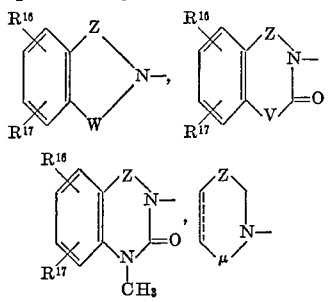

and

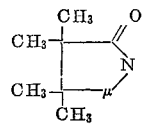

wherein $R^{16}$ and $R^{17}$ when taken separately are selected from the group consisting of hydrogen, (lower)alkyl, (lower)alkoxy, halogen, phenyl, phen(lower)alkyl, (lower)alkoxyphenyl, 2-pyridyl, 4-pyridyl, trifluoromethyl, nitro, di(lower)alkylamino, sulfamido, carb(lower)alkoxy, cyano, (lower)alkylthio, (lower)alkylsulfonyl; and when $R^{16}$ and $R^{17}$ are joined, they complete a benzene ring to form therewith a naphthalene ring; Z is selected from the group consisting of sulfonyl, carbonyl and methylene; V is selected from the group consisting of oxygen, sulfur and methylene; $\mu$ is selected from the group consisting of carbonyl and methylene; and the broken line indicates the presence of a single or double bond between these two positions.

The compounds of the invention may be prepared according to the following reaction sequence:

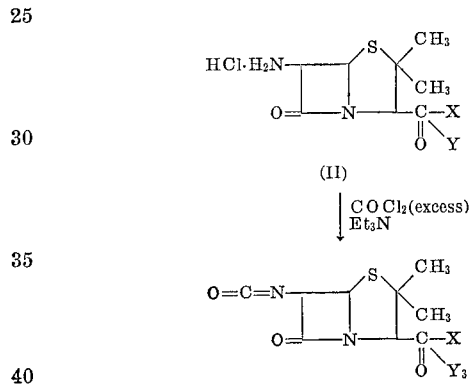

wherein X and Y are the same as hereinabove described. The starting materials of Formula II are described in copending United States patent application Ser. No. 843,783, filed July 22, 1969, by Richard Bogash, Milton Wolf and John H. Sellstedt which is now U.S. 3,669,980 and is hereby incorporated by reference.

The preferred method of carrying the reaction is to dissolve the 6-amino-2-amido saccharamide in an organic solvent such as dried methylene chloride and cooling the mixture to about −30° C. to about −60° C. Phosgene is then added followed by the addition of triethylamine. The solvent is thereafter removed and the product may thereafter be extracted with appropriate solvent.

The novel intermediates of the invention are useful in the preparation of a new class of penicillin derivatives. They are exemplified by Formula III:

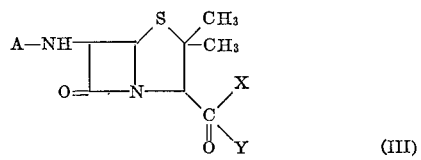

(III)

wherein A is an organic radical and X and Y are the same as hereinabove described.

A particular example of a compound which may be prepared from the novel intermediates of this invention, is Example II.

The novel intermediates of this invention may be used to prepare known antibiotically active compounds such as penicillin G saccharimide, penicillin V saccharimide and ampicillin saccharimide. For example, penicillin G saccharimide may be prepared by the reacting 6-isocyanato penicillanic acid saccharimide with phenylacetic acid. This is a known compound which may be employed for its antibacterial effect or it may be used as an intermediate to prepare penicillin G by cleaving off the saccharimido group by hydrolysis.

As used herein and in the appended claims, the terms (lower)alkyl are used to include hydrocarbon groups containing from one to about six carbon atoms including but not limited to methyl, ethyl, i-propyl, n-propyl, n-butyl and the like. The term (lower)alkoxy is used to include hydrocarbonoxy groups containing from one to about six carbon atoms such as methoxy, ethoxy, i-propoxy, n-butoxy and the like. The term halogen is used to include bromo, fluoro, chloro and iodo. The term (lower)alkanoyl is used to describe groups such as

wherein R is (lower)alkyl.

The compound of Example II is antibiotically active and inhibits Staphlococcus aureus, Smith when applied in an aqueous dispersion at a concentration of 15.6 mcg./ml.

EXAMPLE I

2 - [3,3 - dimethyl-6-isocyanato-7-oxo-4-thia-1-azabicyclo[3.2.0]hept - 2 - yl)carbonyl] - 1,2 - benzisothiazol-3-(2H)-one, 1,1-dioxide A mixture of 2-[(6-amino-3,3-dimethyl-7-oxo-4-thia-1-azabicyclo[3.2.0]hept - 2 - yl)carbonyl]-1,2-benzisothiazol-3(2H)-one 1,1-dioxide, hydrochloride [10.0 g., 0.018 m. (75% assay) in 150 ml. of dried methylene chloride was stirred and cooled to −45° C. under a nitrogen atmosphere. Phosgene (5.0 ml., 0.068 m.) in 50 ml. of dried methylene chloride was added followed by the slow addition in 20 minutes of triethylamine (6.65 ml., 0.048 m.) in 50 ml. of dried methylene chloride. The reaction mixture was stirred at −45° C. for 3 hrs. and then evaporated to dryness at ambient temperature by means of a vacuum pump.

The solid residue was extracted several times with benzene and this solution then evaporated to dryness. Re-extraction with benzene followed by precipitation with hexane give the title compound. M.P. 195 d. (uncorr.).

Analysis.—Calcd. for $C_{16}H_{13}N_3S_2O_6$ (percent): C, 47.17; H, 3.22; N, 10.33. Found (percent): C, 47.07; H, 3.50; N, 9.98.

EXAMPLE II

1 - butyl - 3 - [3,3-dimethyl-7-oxo-2-(3-oxo-1,2-benzisothiozolin - 2 - ylcarbonyl) - 4 - thia - 1 - azabicyclo-[3.2.0]hept-6-yl]urea S',S'-dioxide To a solution of 2.5 g. (0.00614 m.) of 2-[(6-isocyanato - 3,3 - dimethyl - 7 - oxo-4-thia-1-azabicyclo-[3.2.0]hept - 2 - yl)carbonyl]-1,2 - benzisothiazolin-3-one 1,1-dioxide in 50 ml. of dried methylene chloride at −50° C. was slowly added 0.675 ml. (0.00682 m.) of n-butylamine in 20 ml. of dried methylene chloride. The solution was stirred for 1.5 hrs. at −50° C. and then another hour at 25° C. The solvent was removed by evaporation leaving a solid. IR (in KBr) absorption maxima 5.5μ, 5.7μ, 6.0μ and 6.5μ. Iodometric assay 65%.

EXAMPLE III

By procedures analagous to those employed above, the following compounds are prepared:

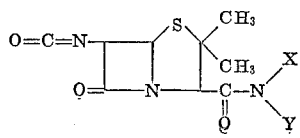

wherein X and Y when taken separately are defined as follows:

| Y: | X: |
|---|---|
| Cyano | Cyano. |
| Cyano | Nitro. |
| Cyano | Trifluoromethylsulfonyl. |
| Cyano | Carbopentoxy. |
| Cyano | N,N-dimethylcarbamyl. |
| Cyano | Ethylsulfonyl. |
| Cyano | N,N-diethylsulfamyl. |
| Nitro | Trifluoromethylsulfonyl. |
| Nitro | Carbethoxy. |
| Nitro | N,N-dipropylcarbamyl. |
| Nitro | Methylsulfonyl. |
| Nitro | N-ethyl-N-methylsulfamyl. |
| Trifluoromethylsulfonyl | Trifluoromethylsulfonyl. |
| Trifluoromethylsulfonyl | Carbohexoxy. |
| Trifluoromethylsulfonyl | N-ethyl-N-methylcarbamyl. |
| Trifluoromethylsulfonyl | Propylsulfonyl. |
| Trifluoromethylsulfonyl | N,N-dimethylsulfamyl. |
| Carbomethoxy | N,N-dipentylcarbamyl. |
| Carbomethoxy | Methylsulfonyl. |
| Carbomethoxy | N,N-dimethylsulfamyl. |
| N,N-dimethylcarbamyl | Pentylsulfonyl. |
| N,N-dimethylcarbamyl | N,N-dimethylsulfamyl. |
| N,N-dimethylcarbamyl | N,N-dimethylcarbamyl. |
| N,N-dimethylsulfamyl | N,N-dimethylsulfamyl. |
| Cyano | p-Butylbenzoyl. |
| Cyano | m-Toluyl. |
| Cyano | p-Phenoxybenzoyl. |
| Methylsulfonyl | o-Chlorobenzoyl. |
| Methylsulfonyl | 2,4-dibromobenzoyl. |
| Carbethoxy | p-Chloro-m-toluyl. |
| Carbethoxy | p-Iodobenzoyl. |
| N,N-dimethylcarbamyl | p-Ethylbenzoyl. |
| Carbobutoxy | p-Methoxybenzoyl. |
| Nitro | p-Phenylbenzoyl. |
| p-Nitrophenylsulfonyl | m-Nitrobenzoyl. |
| p-Trifluoromethylphenylsulfonyl | p-Methylsulfonylbenzoyl. |
| 2,4-dinitrophenylsulfonyl | p-Toluyl. |
| p-Chlorophenylsulfonyl | p-Methoxybenzoyl. |
| Trifluoromethylsulfonyl | p-(N,N-dimethylsulfamyl)-benzoyl. |
| m-(N,N-diethylsulfamyl)benzoyl | Methylsulfonyl. |
| Carbomethoxy | p-Trifluoromethylbenzoyl. |
| Cyano | o-Chlorophenylsulfonyl. |
| Cyano | m-Trifluoromethylphenylsulfonyl. |
| Trifluoromethylsulfonyl | p-Nitrophenylsulfonyl. |
| N,N-dimethylcarbamyl | 2-bromo-4-chlorophenylsulfonyl. |

EXAMPLE IV

The following compounds may also be prepared according to the procedure analogous to procedure employed in Example I:

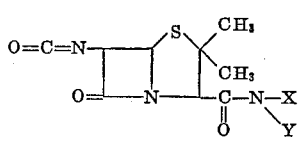

wherein X and Y when taken together are as follows:

3-oxo-1,2-benzisothiaozlin-2-yl, 1,1-dioxide;
4-methoxyphthalimido;
maleimido;
succinimido;
3-oxo-4-1,2-benzoxathiazin-2(3H)-yl, 1,1-dioxide;
3-oxo-6-nitro-1,4,2-benzodithiazin-2(3H)-yl, 1,1-dioxide;

We claim:
1. A compound of the formula

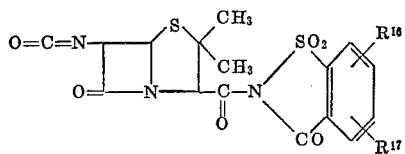

wherein $R^{16}$ and $R^{17}$ when taken separately are selected from the group consisting of hydrogen, lower alkyl, lower alkoxy, halogen, phenyl, phen(lower)alkyl; lower alkoxyphenyl, 2-pyridyl, 4-pyridyl, trifluoromethyl, nitro, di-(lower)alkylamino, sulfamido, carb(lower)alkoxy, cyano, lower alkylthio, lower alkylsulfonyl, and when $R^{16}$ and $R^{17}$ are joined they complete a benzene ring fused to the existing benzene ring of the saccharyl moiety to form a naphthalene ring.

2. A compound as defined in claim 1 which is 2-[3,3-dimethyl - 6 - isocyanato - 7 - oxo-4-thia-1-azabicyclo-[3.2.0]hept - 2 - yl)carbonyl]-1,2-benzisothiazol-3(2H)-one, 1,1-dioxide.

References Cited
UNITED STATES PATENTS

| 3,383,383 | 5/1968 | Gapp et al. | 260—239.1 |
| 3,399,207 | 8/1968 | Bamberg et al. | 260—239.1 |
| 3,453,264 | 7/1969 | Fosker et al. | 260—239.1 |

NICHOLAS S. RIZZO, Primary Examiner

U.S. Cl. X.R.

424—271